United States Patent
Ando

(10) Patent No.: US 7,349,197 B2
(45) Date of Patent: Mar. 25, 2008

(54) METHOD FOR MANUFACTURING CAPACITOR ELEMENT FOR SOLID ELECTROLYTIC CAPACITOR, METHOD FOR MANUFACTURING SOLID ELECTROLYTIC CAPACITOR USING SUCH CAPACITOR ELEMENT AND SOLID ELECTROLYTIC CAPACITOR USING SUCH CAPACITOR ELEMENT

(75) Inventor: Hideki Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 249 days.

(21) Appl. No.: 10/523,547

(22) PCT Filed: Jul. 18, 2003

(86) PCT No.: PCT/JP03/09211

§ 371 (c)(1),
(2), (4) Date: Jan. 31, 2005

(87) PCT Pub. No.: WO2004/013877

PCT Pub. Date: Feb. 12, 2004

(65) Prior Publication Data

US 2006/0164792 A1  Jul. 27, 2006

(30) Foreign Application Priority Data

Aug. 1, 2002  (JP) ............................. 2002-224945

(51) Int. Cl.
*H01G 9/00* (2006.01)
(52) U.S. Cl. ...................... 361/523; 361/525; 361/528; 361/529; 361/534; 29/25.01; 29/25.03
(58) Field of Classification Search ........ 361/523–525, 361/528–534, 516–519; 29/25.01, 25.03
See application file for complete search history.

(56) References Cited

U.S. PATENT DOCUMENTS

| 5,005,107 | A | * | 4/1991 | Kobashi et al. ............. 361/540 |
| 5,461,538 | A | | 10/1995 | Kuriyama |
| 6,151,205 | A | * | 11/2000 | Kobayashi et al. ......... 361/523 |
| 6,154,358 | A | * | 11/2000 | Fukaumi et al. ............ 361/523 |
| 6,206,937 | B1 | * | 3/2001 | Kudoh et al. ............... 29/25.03 |
| 6,430,033 | B1 | * | 8/2002 | Mitsui et al. ................ 361/525 |
| 6,674,635 | B1 | * | 1/2004 | Fife et al. .................... 361/523 |

FOREIGN PATENT DOCUMENTS

| JP | 49-89843 | 8/1974 |
| JP | 7-74051 | 3/1995 |
| JP | 7-74062 | 3/1995 |
| JP | 10-50563 | 2/1998 |

\* cited by examiner

*Primary Examiner*—Nguyen T. Ha
(74) *Attorney, Agent, or Firm*—Hamre, Schumann, Mueller & Larson, P.C.

(57) ABSTRACT

A capacitor element in which a dielectric film, a solid electrolyte layer, and a cathode-side electrode film are formed on the anode chip body obtained by sintering a powder of a valve-acting metal is manufactured without causing decrease in the effective volume of the metal powder or degradation of electric connection.

This is attained by adhesively attaching one end surface of the anode chip body to the surface of a metal plate with an electrically conductive adhesive, so that the end surface can be peeled off from the metal plate, successively forming a dielectric film, a solid electrolyte layer, and a cathode-side electrode film, in this order, on the anode chip body in this state to form a capacitor element, and peeling the capacitor element off and separating it from the metal plate.

3 Claims, 6 Drawing Sheets

METHOD FOR MANUFACTURING CAPACITOR ELEMENT FOR SOLID ELECTROLYTIC CAPACITOR, METHOD FOR MANUFACTURING SOLID ELECTROLYTIC CAPACITOR USING SUCH CAPACITOR ELEMENT AND SOLID ELECTROLYTIC CAPACITOR USING SUCH CAPACITOR ELEMENT

BACKGROUND OF THE INVENTION

The present invention relates to a method for manufacturing a capacitor element used in a solid electrolytic capacitor comprising a powder of a valve-acting metal such as tantalum, niobium, or aluminum, a method for manufacturing a solid electrolytic capacitor using such a capacitor element, and a solid electrolytic capacitor using such a capacitor element.

As described, for example, in Japanese Patent Applications Laid-open Nos. H7-74062 and H10-50563 representing the conventional technology, a capacitor element for a solid electrolytic capacitor of this type is manufactured by employing a method in which:

(1) first, a porous anode chip body obtained by solid molding a powder of a valve-acting metal and then sintering is manufactured so that an anode wire manufactured from a valve-active metal bonded to the metal powder protrudes from the anode chip body;

(2) then, the anode chip body is immersed in a conversion solution such as an aqueous solution of phosphoric acid and in this state an anode oxidation treatment is conducted by applying a direct current between the metal powder and the conversion solution, thereby forming a dielectric film such as a tantalum pentoxide film on the surface of each metal particle in the anode chip body;

(3) then several cycles of operations are repeated, each cycle comprising the steps of immersing the anode chip body into an aqueous solution for solid electrolyte such as an aqueous solution of manganese nitrate, impregnating the porous structure in the anode chip body with the aqueous solution for solid electrolyte such as an aqueous solution of manganese nitrate, pulling the anode chip body from the aqueous solution for solid electrolyte, drying, and firing. As a result, a solid electrolyte film composed of a metal oxide such as manganese dioxide is formed on top of the dielectric film on the surface of the anode chip body;

(4) then, a cathode-side electrode film composed of a graphite layer as a prime layer and a metal layer, e.g., of silver as a top layer is formed on the surface of the solid electrolyte layer in the anode chip body.

Further, the capacitor element manufactured in the above-described manner has been conventionally assembled into a packaged solid electrolyte capacitor by disposing the capacitor element between an anode-side lead terminal and cathode-side lead terminal so that the anode wire thereof is mounted in a fixed condition on the anode-side lead terminal and the cathode-side electrode film is connected to the cathode-side lead terminal, and then sealing the entire configuration with a package body.

As described hereinabove, the basic configuration has been conventionally produced by mounting the anode wire in a fixed condition on the porous anode chip body so that the anode wire was electrically joined to the metal powder in the anode chip body. As a result, the formation of a dielectric film, a solid electrolyte layer, and a cathode-side electrode film on the anode chip body could be easily conducted in a state in which the anode chip body was supported with the anode wire. Another advantage was that in the case where a solid electrolytic capacitor was obtained as a final product, the anode-side lead terminal could be reliably electrically connected to the metal powder in the anode chip body via the anode wire.

However, the following drawbacks were associated with this method.

Thus, the capacitor element was obtained by forming a dielectric film, a solid electrolyte layer, and a cathode-side electrode film on the anode chip body in a state in which an anode wire was mounted in a fixed condition on the anode chip body, and this capacitor element was assembled with the anode wire mounted in a fixed condition thereon in a solid electrolytic capacitor as a final product. Therefore, the size of the anode wire was added to the size of the solid electrolytic capacitor. As a result, when the size of the solid electrolytic capacitor as a final product has been determined in advance, the anode wire hindered the increase in the capacitance of the capacitor, and when the capacitance of the capacitor has been determined in advance, the anode wire increased dimensions and weight of the solid electrolytic capacitor.

Moreover, in order to connect electrically the anode wire in the capacitor element to the metal powder in the anode chip body, the one end portion thereof was embedded in the anode chip body. Therefore, the effective volume taken by the metal powder in the volume of the anode chip body was reduced by the aforementioned end portion of the anode wire embedded in the anode chip body. This was a significant obstacle for reducing the size and increasing the capacity of the capacitor element.

DISCLOSURE OF THE INVENTION

It is a technological object of the present invention to resolve the above-described problems by eliminating the anode wire.

In order to attain the above-described technological object, the present invention provides a method for manufacturing a capacitor element for a solid electrolytic capacitor comprising the steps of forming a porous anode chip body by solidly molding a powder of a valve-acting metal and then sintering the same, adhesively attaching one end surface of the anode chip body to the surface of a metal plate with an electrically conductive adhesive, so that the anode chip body can be peeled off from the metal plate, successively forming a dielectric film, a solid electrolyte layer, and a cathode-side electrode film, in this order, on the anode chip body adhesively attached to the metal plate, and separating the anode chip body from the metal plate.

Further, the present invention also provides a method for manufacturing a solid electrolytic capacitor in accordance with the present invention comprising manufacturing a capacitor element via the steps of forming a porous anode chip body by solidly molding a powder of a valve-acting metal and then sintering the same, adhesively attaching one end surface of the anode chip body to the surface of a metal plate with an electrically conductive adhesive so that the anode chip body can be peeled off from the metal plate, successively forming a dielectric film, a solid electrolyte layer, and a cathode-side electrode film, in this order, on the anode chip body adhesively attached to the metal plate, separating the anode chip body from the metal plate, the method further comprising the steps of providing an anode-side terminal on one end surface of the anode chip body in the capacitor element, providing a cathode-side terminal on the cathode-side electrode film of the anode chip body, and packaging the entire the capacitor element with a synthetic resin.

The present invention also provides a solid electrolytic capacitor, wherein a capacitor element comprises a porous anode chip body obtained by solidly molding a powder of a valve-acting metal and then sintering, a dielectric film formed on the surface of the anode chip body other than the one end surface thereof, a solid electrolyte layer formed on top of the dielectric film other than the one end surface, and a cathode-side electrode film formed on top of the solid electrolyte layer other than the one end surface, an anode-side terminal is provided on the metal powder exposed on the one end surface of the anode chip body in the capacitor element, and a cathode-side terminal is provided on the cathode-side electrode film in the capacitor element.

Further, the present invention also provides a solid electrolytic capacitor, wherein a capacitor element comprises a porous anode chip body obtained by solidly molding a powder of a valve-acting metal and then sintering, a dielectric film formed on the surface of the anode chip body other than the one end surface thereof, a solid electrolyte layer formed on top of the dielectric film other than the one end surface, and a cathode-side electrode film formed on top of the solid electrolyte layer other than the one end surface, an anode-side metal film is provided on the metal powder exposed on the one end surface of the anode chip body in the capacitor element, and a cathode-side metal film is provided on the cathode-side electrode film in the capacitor element.

Thus, if a metal plate is adhesively attached to one end surface of the anode chip body with an electrically conductive adhesive, so that the anode chip bodies can be peeled off from the metal plate, then when a dielectric film, a solid electrolyte layer, and a cathode-side electrode film are successively formed, in this order, on the anode chip body after the aforementioned process, the anode chip body can be easily supported by the metal plate. Furthermore, when the dielectric film is formed by anodic oxidation treatment, then the direct electric current can be reliably supplied to the metal powder in the anode chip body via the metal plate and electrically conductive adhesive.

Furthermore, when the anode chip body is peeled off and separated from the metal plate, part of the metal powder in the anode chip body is exposed on one end surface of the anode chip body in a state in which no dielectric film with high electric properties is formed thereon.

In other words, the capacitor element can be manufactured in a state in which the anode-side terminal can be reliably electrically connected to the metal powder in the anode chip body and mounting of the anode wire in a fixed condition on the anode chip body, as in the conventional processes, can be eliminated.

As a result, the effective volume of the metal powder in the anode chip body of the capacitor element can be increased because no anode wire is used in this process.

Further, in the solid electrolytic capacitor which is a final product using the capacitor element, when the size thereof has been determined in advance, the capacitance of the capacitor can be increased because the anode wire is not used, as was mentioned above. Furthermore, when the capacitance of the capacitor has been determined in advance, the size and weight of the solid electrolytic capacitor can be reduced because the anode wire is not used, as was mentioned above.

In particular, the method for manufacturing a capacitor element, as described in claim 2, may further comprise a step of forming a coating film of a water-repellent synthetic resin on the surface of the metal plate so as to seal the aforementioned one end surface of the anode chip bodies with the coating film, between the steps of adhesively attaching the aforementioned one end surface of the anode chip to the surface of the metal plate and forming the dielectric film, the solid electrolyte layer, and the cathode-side electrode film on the anode chip bodies. As a result, the formation of the solid electrolyte layer and cathode-side electrode film on one end surface in the anode chip body can be prevented. In other words, in the manufacture of the capacitor element, any one of the solid electrolyte layer and cathode-side electrode film, which are formed on the anode chip body, or both the solid electrolyte layer and the cathode-side electrode film, are reliably prevented from being directly formed, without a dielectric film, on the metal powder on the aforementioned one end surface of the anode chip body. As a result, the formation of a defective product is prevented. Therefore, the advantage is that the occurrence rate of defective products can be greatly reduced.

DETAILED DESCRIPTION OF THE PREFERRED EMBODIMENTS

Embodiments of the present invention will be described below with reference to FIGS. 1 to 12.

Figure 1:
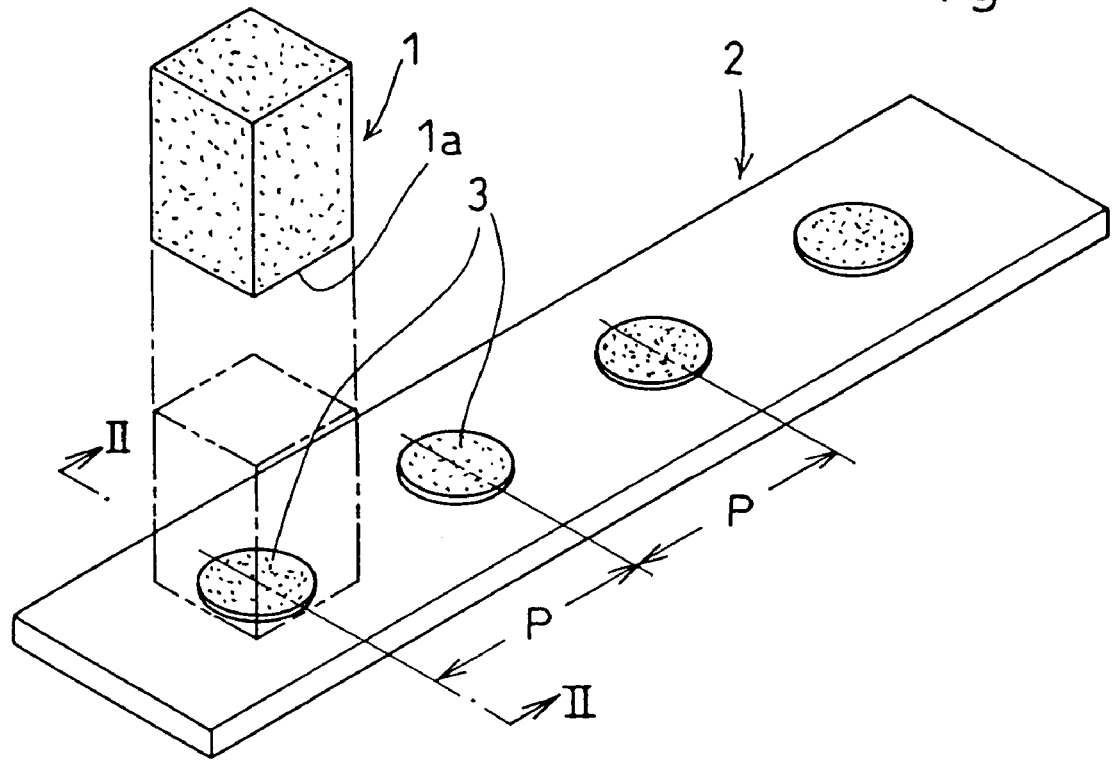
FIG. 1 is a perspective view showing the anode chip body and metal plate in the preferred embodiment of the present invention.
Figure 2:
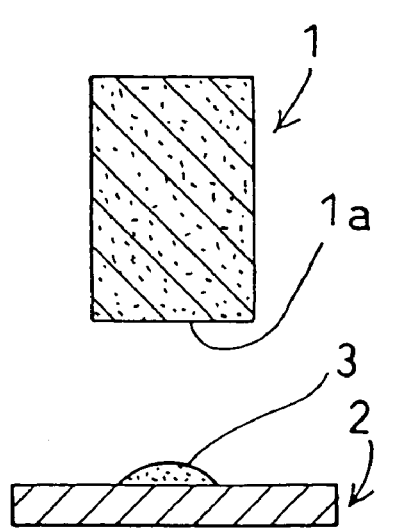
FIG. 2 is a cross-sectional view along II-II in FIG. 1.

First, as shown in FIG. 1 and FIG. 2, porous anode chip bodies 1 are fabricated by solidly molding a powder of a valve-active metal such as tantalum into rectangular parallelepiped bodies and then sintering. A narrow metal plate 2 is prepared from stainless steel or aluminum. A heat-resistant and electrically conductive adhesive 3 is then applied to the surface of the metal plate 2 with an appropriate pitch P in the longitudinal direction of the metal plate 2.

Figure 3:
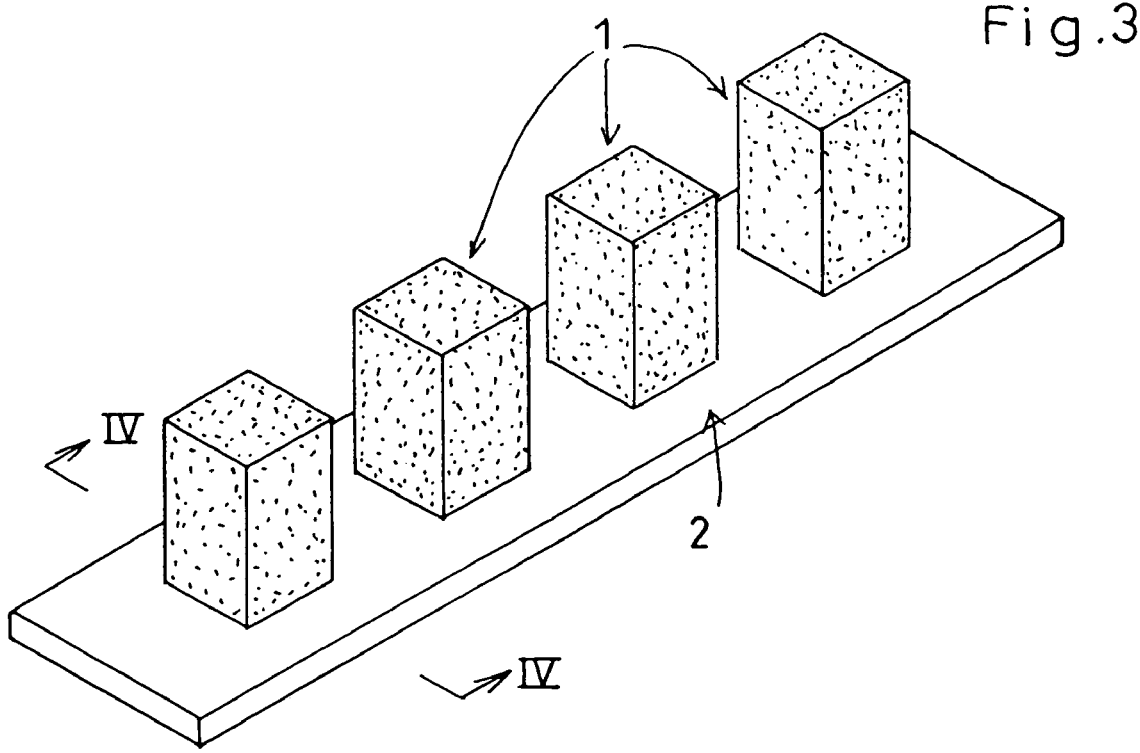
FIG. 3 is a perspective view showing a state in which the anode chip body is mounted in a fixed condition on the metal plate.
Figure 4:
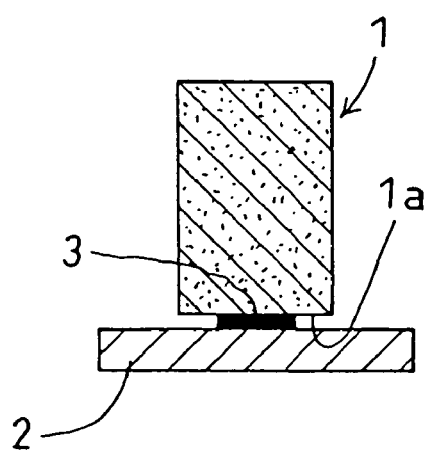
FIG. 4 is a cross-sectional view along IV-IV in FIG. 3.

Then, the anode chip bodies 1 are set in locations of each electrically conductive adhesive 3 on the surface of the metal plate 2, so that the end surface 1a of the chip bodies faces the metal plate 2. The electrically conductive adhesives 3 are then heated and dried to attach a plurality of the anode chip bodies 1 to the metal plate 2 so that the chip bodies can be peeled therefrom, as shown in FIG. 3 and FIG. 4.

Further, instead of applying the electrically conductive adhesives to the surface of the metal plate 2, they may be applied to one end surface 1a of the anode chips or on the surface of the metal plate 2 and one end surface 1a of the anode chip body 1.

Figure 5:
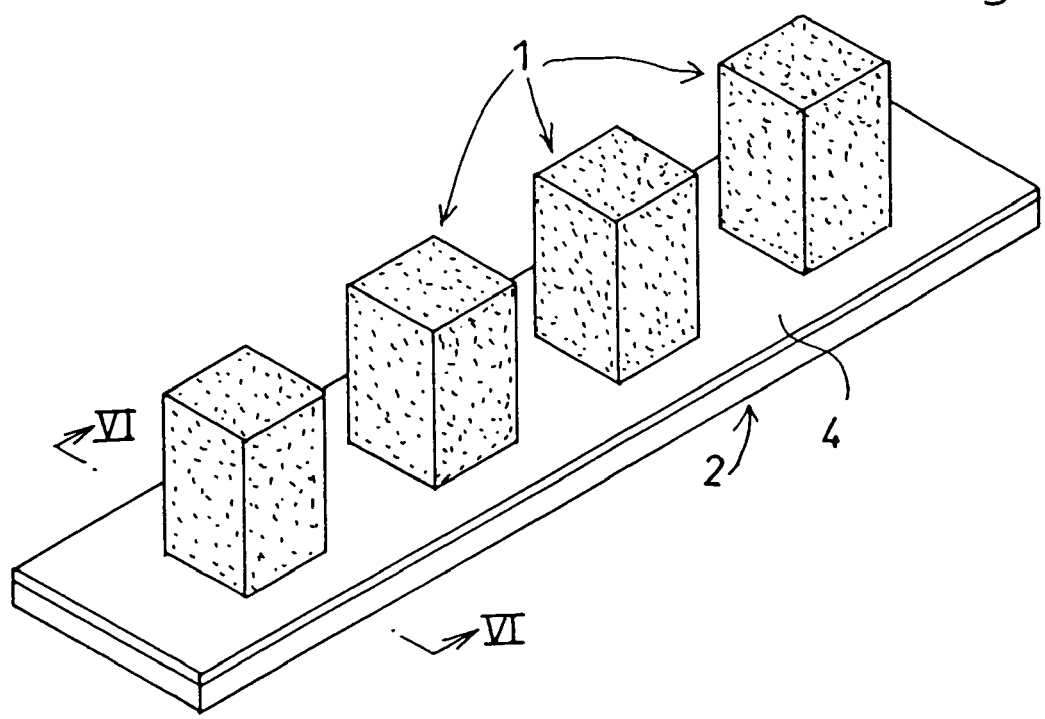
FIG. 5 is a perspective view showing a state in which a coating film of a synthetic resin was formed on the metal plate.
Figure 6:
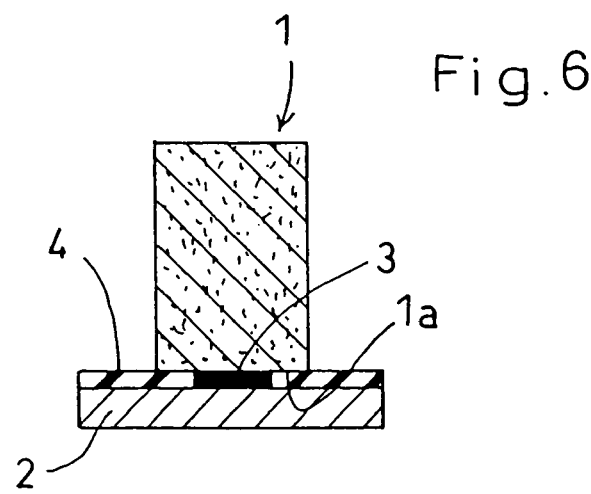
FIG. 6 is a cross-sectional view along VI-VI in FIG. 5.

Then, as shown in FIG. 5 and FIG. 6, a coating film of a water-repellent synthetic resin is formed on the surface of the metal plate 2 so as to seal the one end surface 1a of each anode chip body 1 with the film 4.

The entire metal plate 2 with a plurality of anode chip bodies 1 adhesively attached thereto in the above-described manner is then immersed into a conversion coating solution such as an aqueous solution of phosphoric acid, and a direct electric current is applied in this state between the metal plate and the conversion coating solution. As a result, the electric current flows from the metal plate to the metal powder in each anode chip body 1 via the electrically conductive adhesive 3 and the metal powder is subjected to anodic oxidation treatment. As a result, a dielectric film such as tantalum pentoxide is formed on the surface of each metal powder in each anode chip body 1.

Figure 7:
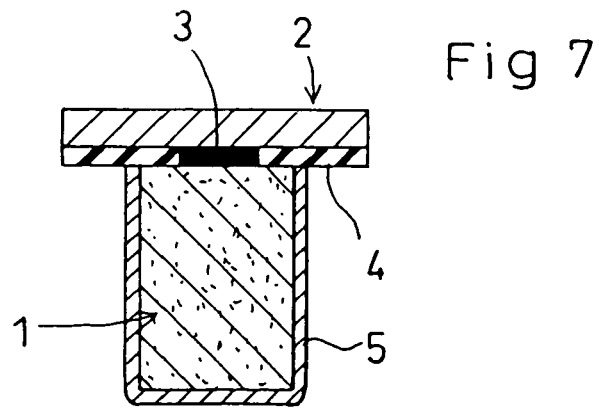
FIG. 7 is a plan view in a longitudinal section illustrating the state in which a solid electrolyte layer was formed on the anode chip body.

All the anode chip bodies 1 in the metal plate 2 are then immersed into an aqueous solution for a solid electrolyte such as an aqueous solution of manganese nitrate, and the porous structure in each anode chip body 1 is impregnated with the aqueous solution for solid electrolyte such as an aqueous solution of manganese nitrate, followed by removal from the aqueous solution for solid electrolyte, drying, and firing. The aforementioned operations are repeated several times. As a result, a solid electrolyte layer 5 composed of a metal oxide such as manganese dioxide is formed on top of the aforementioned dielectric film on the surface of each anode chip body 1, as shown in FIG. 7.

Figure 8:
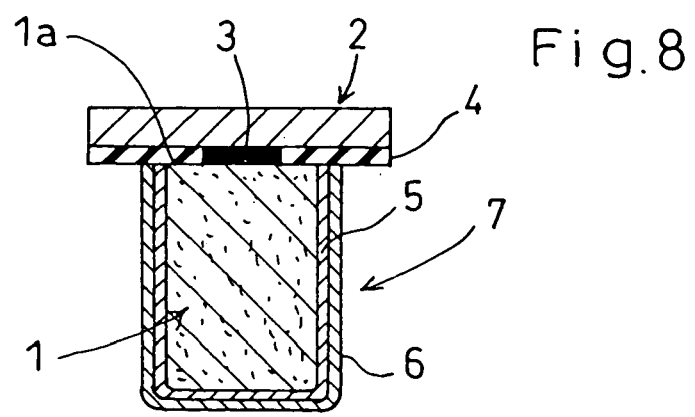
FIG. 8 is a plan view in a longitudinal section illustrating the state in which a capacitor element was obtained by forming a cathode-side electrode film on the anode chip body.

Then a cathode-side electrode film 6 composed of a graphite layer as a prime layer and a metal layer, e.g., of silver, as a top layer is formed on top of the solid electrolyte layer 5 on the surface of each anode chip body 1 in the metal plate 2, thereby producing capacitor elements 7, as shown in FIG. 8.

Figure 9:
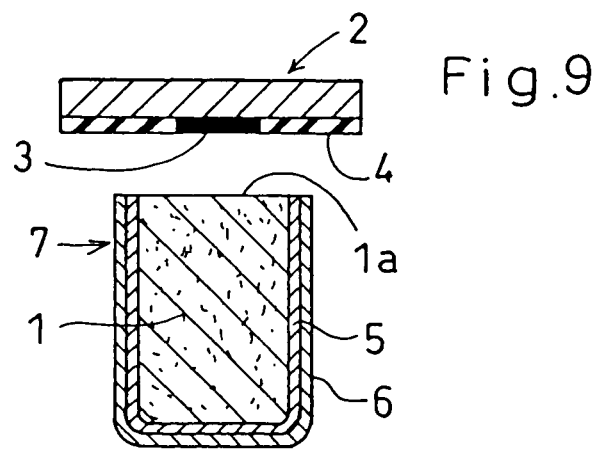
FIG. 9 is a plan view in a longitudinal section illustrating the state in which the capacitor element was peeled off from the metal plate.

Each capacitor element 7 in the metal plate 2 is peeled off and separated from the metal plate 2, as shown in FIG. 9. As a result of the peeling and separation process, part of the metal powder present in the anode chip body 1 can be exposed in a state in which the dielectric film with high insulating properties has not been formed on the aforementioned one end surface 1a of the anode chip body 1 of each capacitor element 7.

Further, when the solid electrolyte layer 5 and cathode-side electrode film 6 are formed on each anode chip body 1, the aforementioned one end surface 1 of each anode chip body 1 is sealed with the coating film 4 formed from the water-repellent synthetic resin. As a result, any one of the solid electrolyte layer 5 and cathode-side electrode film 6, or both the layer and the film, are reliably prevented from being formed directly, that is, without the dielectric film, on the aforementioned one end surface 1a.

Figure 10:
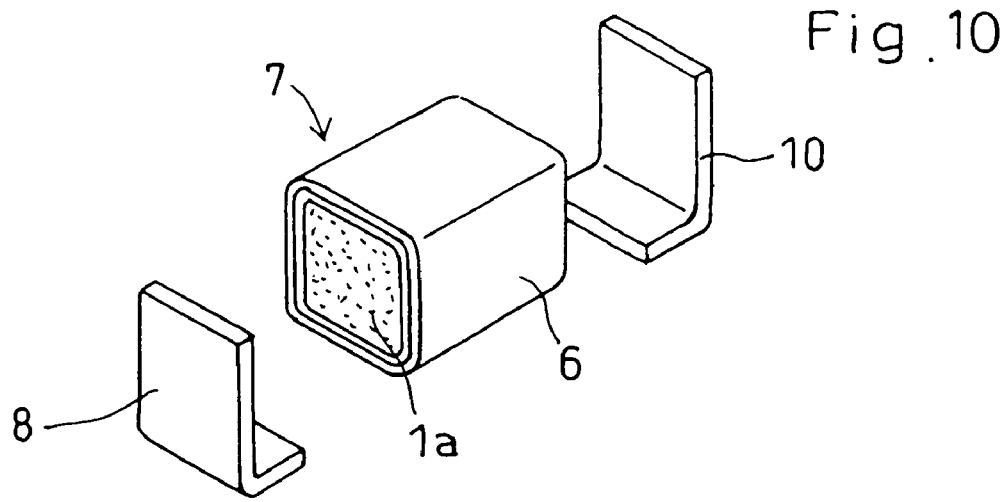
FIG. 10 illustrates the disassembled solid electrolytic capacitor.
Figure 11:
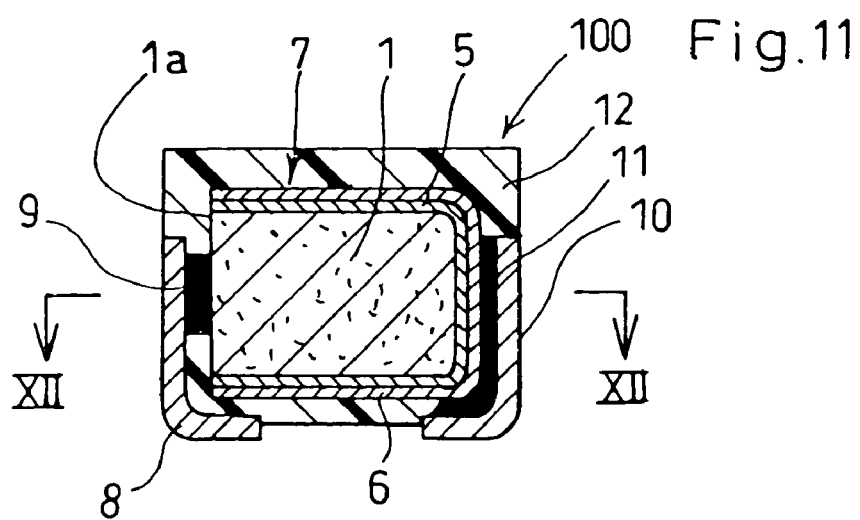
FIG. 11 is a plan view in a longitudinal section of the solid electrolytic capacitor.
Figure 12:
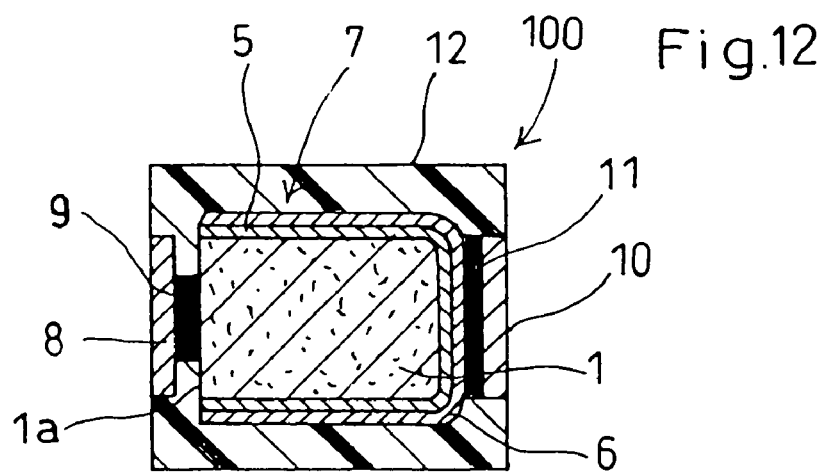
FIG. 12 is a plan sectional view along XII-XII in FIG. 11.

The capacitor element 7 manufactured in the above-described manner is assembled into a solid electrolytic capacitor 100 as a final product, as shown in FIGS. 10 to 12.

Thus, an anode-side terminal 8 made from a thin metal plate is adhesively attached with an electrically conductive paste 9 to the aforementioned one end surface 1a of the anode chip body 1 of the capacitor element 7. On the other hand, a cathode-side terminal 10 made from a thin metal plate is adhesively attached with an electrically conductive pate 11 to the cathode-side electrode film 6 in the capacitor element 7. In this state, the electrically conductive pastes 9, 11 are cured by heating and drying, thereby providing for mounting in a fixed condition. Then, the solid electrolytic capacitor 100 can be assembled by packaging the entire body with a heat-resistant synthetic resin 12 such as an epoxy resin.

Further, when the solid electrolytic capacitor 100 is assembled, a configuration may be also employed such that, first, the entire capacitor element 7 is packaged with the synthetic resin 12 so that one end surface 1a in the anode chip body 1 of the capacitor element 7 and part of the cathode-side electrode terminal 6 are exposed, and then the anode-side terminal 8 manufactured from the thin metal plate is mounted in a fixed condition on the aforementioned one end surface 1a with the electrically conductive paste 9, whereas the cathode-side lead terminal 10 manufactured from a thin metal plate is mounted in a fixed condition on the exposed portion of the cathode-side electrode film 6 with the electrically conductive paste 11. Alternatively, a configuration may be employed such that an anode-side terminal is formed of a metal film composed of an electrically conductive paste and a metal plated layer corresponding thereto on the aforementioned one end surface 1a, and a cathode-side terminal is formed of a metal film composed of an electrically conductive paste and a metal plated layer corresponding thereto on the exposed portion of the cathode-side electrode terminal 6.

Figure 13:
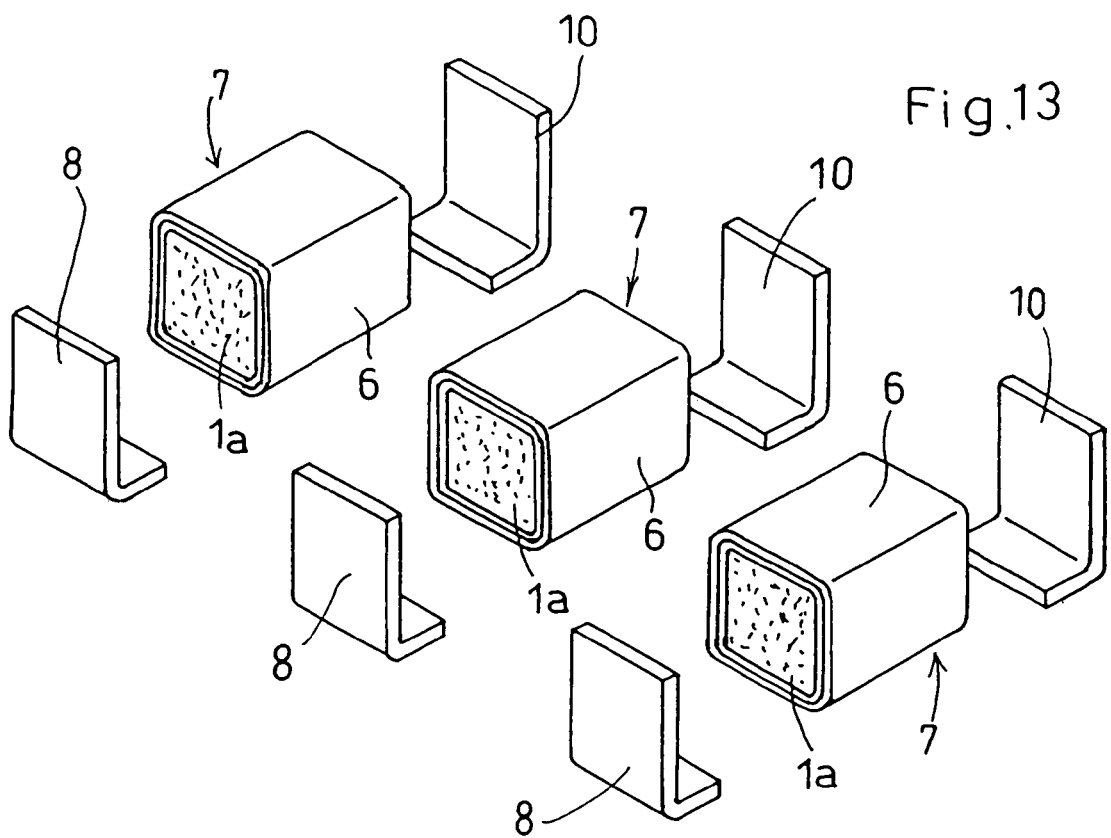
FIG. 13 is a plan view in a longitudinal section of the array-type solid electrolytic capacitor.
Figure 14:
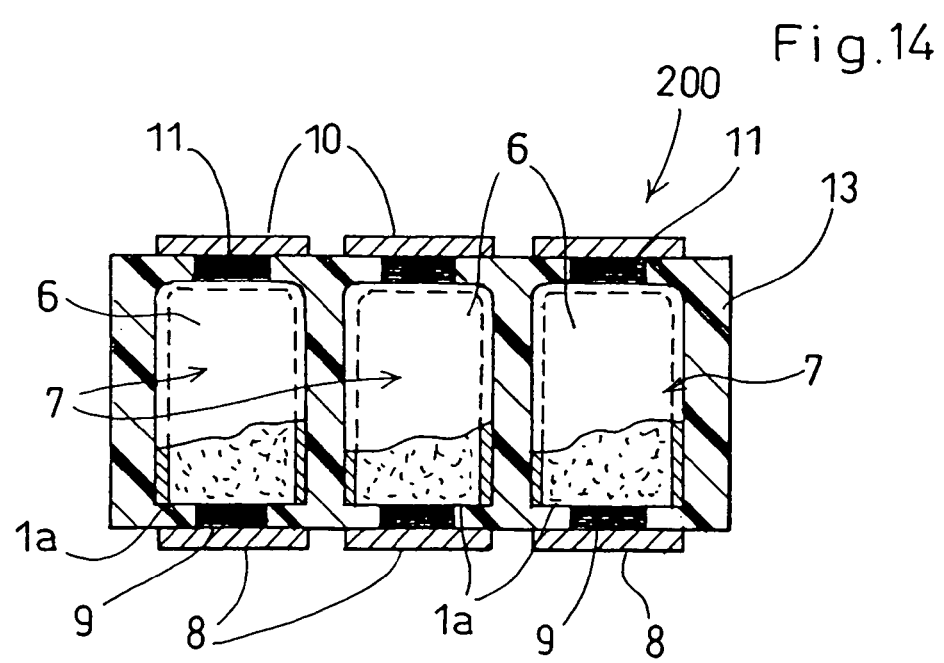
FIG. 14 is a plan view in a longitudinal section of the array-type solid electrolytic capacitor.

Further, in another preferred embodiment, when the solid electrolytic capacitor, which is a final product, is assembled, a plurality of pairs (in the figure, three pairs), each consisting of a capacitor element 7 and two terminals 8, 10, are packaged with one synthetic resin 13, as shown in FIG. 13 and FIG. 14. As a result, it is possible to obtain a solid electrolytic capacitor 200 of an array type in which a plurality of solid electrolytic capacitors are integrated in a row.

Further, it goes without saying that in the case of such a solid electrolytic capacitor of an array type, a configuration may be used in which any one of the anode-side terminal 8 and cathode-side terminal 10, or both terminals, may be common (integrated) for a plurality of capacitor elements 7.

The invention claimed is:

1. A method for manufacturing a capacitor element for a solid electrolytic capacitor comprising the steps of:

forming a porous anode chip body by solidly molding a powder of a valve-acting metal, and then sintering the same;

adhesively attaching one end surface of said anode chip body to a surface of a metal plate with an electrically conductive adhesive, so that the anode chip body can be peeled off from the metal plate;

successively forming a dielectric film, a solid electrolyte layer, and a cathode-side electrode film, in this order, on the anode chip body adhesively attached to said metal plate; and separating said anode chip body from said metal plate.

2. The method for manufacturing a capacitor element for a solid electrolytic capacitor according to claim 1, further comprising the steps of:

forming a coating film of a water-repellent synthetic resin on said surface of said metal plate so as to seal said one end surface of said anode chip body with said coating film, between the steps of adhesively attaching said one end surface of said anode chip body to said surface of the metal plate; and forming the dielectric film, the solid electrolyte layer, and the cathode-side electrode film on the anode chip body.

3. A method for manufacturing a solid electrolytic capacitor comprising manufacturing a capacitor element via the steps of:

forming a porous anode chip body by solidly molding a powder of a valve-acting metal, and then sintering the same;

adhesively attaching one end surface of said anode chip body to a surface of a metal plate with an electrically conductive adhesive, so that the anode chip body can be peeled off from the metal plate;

successively forming a dielectric film, a solid electrolyte layer, and a cathode-side electrode film, in this order, on the anode chip body adhesively attached to said metal plate;

separating said anode chip body from said metal plate;

providing an anode-side terminal on said one end surface of the anode chip body and providing a cathode-side terminal on the cathode-side electrode film of the anode chip body; and packaging the entire said capacitor element with a synthetic resin.

* * * * *